United States Patent [19]
Kim

[11] Patent Number: 5,813,069
[45] Date of Patent: Sep. 29, 1998

[54] MOTOR CONTROL METHOD FOR AUTOMATIC CLOTHES WASHER

[75] Inventor: Hag Won Kim, Kyungki-Do, Rep. of Korea

[73] Assignee: LG Electronics Inc., Rep. of Korea

[21] Appl. No.: 791,435

[22] Filed: Jan. 27, 1997

[30] Foreign Application Priority Data

Mar. 5, 1996 [KR] Rep. of Korea ..................... 5680/1996

[51] Int. Cl.⁶ ................................................. D06F 33/02
[52] U.S. Cl. ........................... 8/159; 68/12.02; 68/12.12; 68/12.14; 68/12.16
[58] Field of Search .............................. 8/159; 68/12.02, 68/12.12, 12.14, 12.16

[56] References Cited

U.S. PATENT DOCUMENTS

| | | | |
|---|---|---|---|
| 4,642,536 | 2/1987 | Boyd, Jr. et al. | 68/12.16 X |
| 5,671,493 | 9/1997 | Moon | 8/159 |
| 5,682,634 | 11/1997 | Cheong et al. | 8/159 |

*Primary Examiner*—Philip R. Coe
*Attorney, Agent, or Firm*—Ostrolenk, Faber, Gerb & Soffen, LLP

[57] ABSTRACT

A motor control method for an automatic washer having an electronically commutated motor (ECM) serving as a power source, the ECM being serially connected to a washing axle and a drying axle without decreasing a spinning rate of the ECM, includes the steps of judging, when a position of the ECM is sensed from a Hall sensor input, whether the automatic washer is set in a washing mode or in a drying mode, determining a spinning direction command signal if the automatic washer is set in the washing mode, calculating a driving logic at a specific moment angle applicable to the washing mode in the spinning direction command signal, calculating a speed command signal in the ECM and a voltage command signal at a real speed value, modulating a pulse width of the voltage command signal in the driving logic, and outputting the pulse width modulated voltage command value. The method enables the ECM to provide a low speed and high torque in a washing mode region and a high speed and low torque in a drying mode region.

4 Claims, 8 Drawing Sheets

| HOLE SENSOR | | | GATE DRIVING REFERENCE SIGNAL | | | | | |
|---|---|---|---|---|---|---|---|---|
| A PHASE | B PHASE | C PHASE | A+ | A− | B+ | B− | C+ | C− |
| 1 | 0 | 1 | 0 | 0 | 1 | 0 | 0 | 1 |
| 1 | 0 | 0 | 0 | 1 | 1 | 0 | 0 | 0 |
| 1 | 1 | 0 | 0 | 1 | 0 | 0 | 1 | 0 |
| 0 | 1 | 0 | 0 | 0 | 0 | 1 | 1 | 0 |
| 0 | 1 | 1 | 1 | 0 | 0 | 1 | 0 | 0 |
| 0 | 0 | 1 | 1 | 0 | 0 | 0 | 0 | 1 |

FIG.12
| HOLE SENSOR | | | GATE DRIVING REFERENCE SIGNAL | | | | | |
|---|---|---|---|---|---|---|---|---|
| A PHASE | B PHASE | C PHASE | A+ | A− | B+ | B− | C+ | C− |
| 1 | 0 | 1 | 0 | 1 | 1 | 0 | 0 | 0 |
| 1 | 0 | 0 | 0 | 1 | 0 | 0 | 1 | 0 |
| 1 | 1 | 0 | 0 | 0 | 0 | 1 | 1 | 0 |
| 0 | 1 | 0 | 1 | 0 | 0 | 1 | 0 | 0 |
| 0 | 1 | 1 | 1 | 0 | 0 | 0 | 0 | 1 |
| 0 | 0 | 1 | 0 | 0 | 1 | 0 | 0 | 1 |
FIG.13
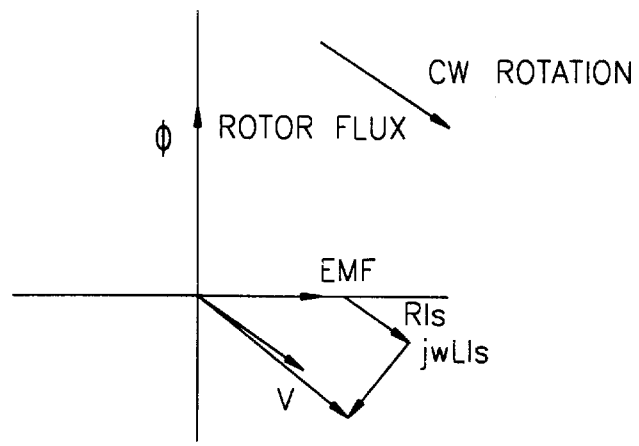
FIG.14
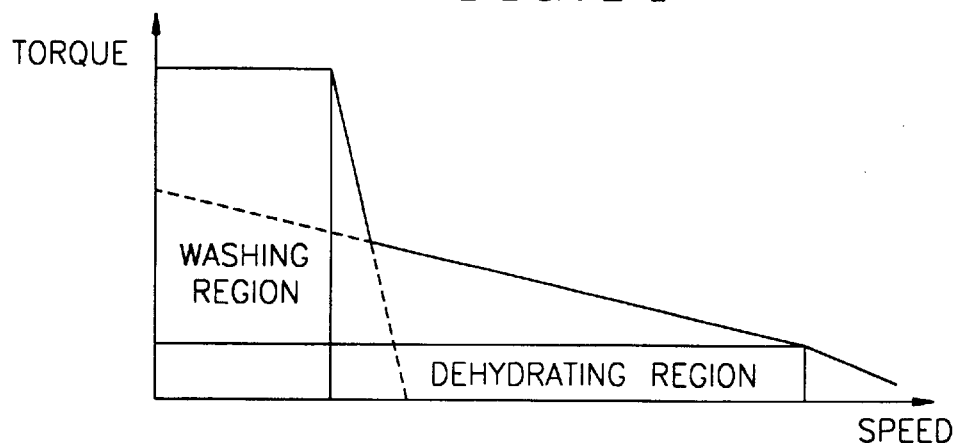

MOTOR CONTROL METHOD FOR AUTOMATIC CLOTHES WASHER

BACKGROUND OF THE INVENTION

1. Field of the Invention

The present invention relates to a washing machine motor control method, and more particularly to an ECM (electronically commutated motor) control method of an automatic washer for effectively controlling the motor during the operation thereof.

2. Description of the Prior Art

As shown in FIG. 1, in a conventional automatic washer 1 there is provided an outer tub 2 inside which is provided an inner tub 3 having a pulsator 4 at a bottom thereof. At an upper portion of the inner tub 3 there are provided a water supply valve (not shown) and a water level sensor (not shown) for sensing a water level in the inner tub 3.

The pulsator 4 is driven to rotate left and right by an ECM 5 serving as a driving power source, a clutch 6 for converting between a washing mode and a drying mode, and a belt/pully 7 for transmitting driving force from the motor 5 to the clutch 6 so as to cause laundry to be washed in the water, for thereby removing soil from the laundry.

The clutch 6 serves to increase or decrease during the operation of the washer a spinning rate of the tub to a level appropriate to washing and drying, by using a planetary gear (not shown) provided adjacent to the motor 5 and the belt 7.

An axle extended from a top of the clutch 6 includes a washing shaft 8 connected to an agitator for stirring laundry, and a drying shaft 9 connected to the inner tub 3. The washing shaft 8 turns at a low speed with high torque in a washing mode and the drying shaft 9 turns at a high speed with low torque to thereby carry out washing and drying.

As shown in FIG. 2, a motor control apparatus for controlling the motor 5 includes: a diode bridge 12 for rectifying an AC voltage 11; a filter capacitor 13 for filtering a DC voltage rectified by the diode bridge 12; an inverter 14 for converting the DC voltage filtered by the filter capacitor 13 into an AC voltage having an average voltage and frequency applicable to the ECM 15; and an inverter controller 21 for controlling the inverter 14.

The inverter controller 21 includes: a reference signal generator 19 for generating a reference signal to selectively turn on and off a plurality of power switching devices PS1–PS6 of the inverter 14, in accordance with a position detecting signal output from a position sensor 22 and an input direction command signal; a speed controller 20 for sensing a spinning rate of the motor 15 by processing information output from the position sensor 22, comparing the sensed value with a programmed speed command and controlling the spinning rate of the motor 15 in accordance with the direction command signal and a voltage command signal; a pulse width modulator 18 for modulating a pulse width in accordance with the voltage command signal output from the speed controller 20 and the reference signal output from the reference signal generator 19; and a gate activator 17 for interfacing with the inverter 14 in accordance with the pulse width modulating signal.

With reference to FIG. 3, the inverter 14 includes: a plurality of power switching elements PS1–PS6; and free wheeling diodes D1–D6 each connected in reverse parallel to a corresponding one of the power switching devices PS1–PS6.

The former three power switching elements PS1–PS3 of the power switching elements PS1–PS6 are connected to a high voltage HV side of the filter capacitor 13, and the latter three elements PS4–PS6 are connected to the ground voltage GRN side of the filter capacitor 13. Phases A,B,C are generated at intermediate connection points between the power switching devices PS4–PS6 connected to the ground voltage and the power switching devices PS1–PS3 connected to the high voltage, which connection points are connected to the ECM 15.

As shown in FIG. 4, the ECM 15 includes; a stator 30 composed of a stator slot 30' for receiving a coil therearound and a coil 30" for generating a magnetic motive force in order to generate a magnetic flux in accordance with electrical currents output from the inverter 14, thereby generating a spatially rotating magnetic field; a rotor 35 which rotates relative to the stator 30; and a sensor 22 for sensing the relative position between the rotor and the stator.

Also, as shown in FIG. 5, washing and a drying cycle region are duplicated in the conventional washer which employs the ECM 15, according to a motor spinning speed and torque, so that a gear ratio is controlled in accordance with operation of the clutch 6 in the washing or drying modes, thereby adjusting a washing and a drying characteristic.

The general characteristics of the ECM 15 can be incorporated into equations (1), (2) and (3), as follows.

$$T = ki \cos \beta \quad (1)$$

T=motor torque
k=torque constant of the motor; and
β=moment.

$$w = emf/k \cos \beta \quad (2)$$

W=motor spinning rate; and
emf=reverse electromotive force of the motor.

$$v = iR + L\,di/dt + emf \quad (3)$$

v=voltage

To control the ECM 15 having such characteristics, the moment angle β must be constantly maintained at zero degrees and the torque constant k of the motor must have a small value so as to increase a no-load spinning rate serving as a maximum speed of the motor during a no-load mode.

Further, to generate a constant torque at a small torque, more electrical current than at a big torque must be applied to the motor.

Consequently, the conventional washing machine employing the ECM 15 has exhibited a decreased motor efficiency due to using a large amount of electrical current as well as an increased cost of such elements as diodes for the rectifier, a filter capacitor, power switching elements for inverters, etc.

Further, due to using an excessive electrical current from the domestic electrical supply, it has been difficult to obtain stability in the operation of an electrical washer, and when employed together with other electrical appliances the supply voltage can be unstable, thereby influencing the operation of the other appliances.

SUMMARY OF THE INVENTION

Accordingly, it is an object of the present invention to provide a motor control method for an automatic clothes washer for reducing the motor current during the operation thereof by transmitting a load torque directly to a motor and thoroughly separating a washing load region and a drying load region accordingly.

To achieve the above object, there is provided a motor control method of an automatic washer having an electronically commutated motor (ECM) serving as a power source, the ECM being serially connected to a washing axle and a drying axle without decreasing a spinning rate of the ECM, which includes the steps of judging, when a position of the ECM is sensed from a Hall sensor input, whether the automatic washer is set in a washing mode or in a drying mode, determining a spinning direction command signal if the automatic washer is set in the washing mode, calculating a driving logic at a specific moment angle applicable to the washing mode in the spinning direction command signal, calculating a speed command signal in the ECM and a voltage command signal at a real speed value, modulating a pulse width of the voltage command signal in the driving logic, and outputting the pulse width modulated voltage command value.

BRIEF DESCRIPTION OF THE DRAWINGS

FIG. 12 is a table showing an embodiment of an operating logic to control a motor in a drying mode of a washing machine according to the present invention;

FIG. 13 is a vector diagram for controlling a motor in a drying mode of a washing machine according to the present invention; and FIG. 14 is a graph showing the relative torque to spinning rate of an ECM according to the present invention.

DETAILED DESCRIPTION OF THE INVENTION

Figure 1:
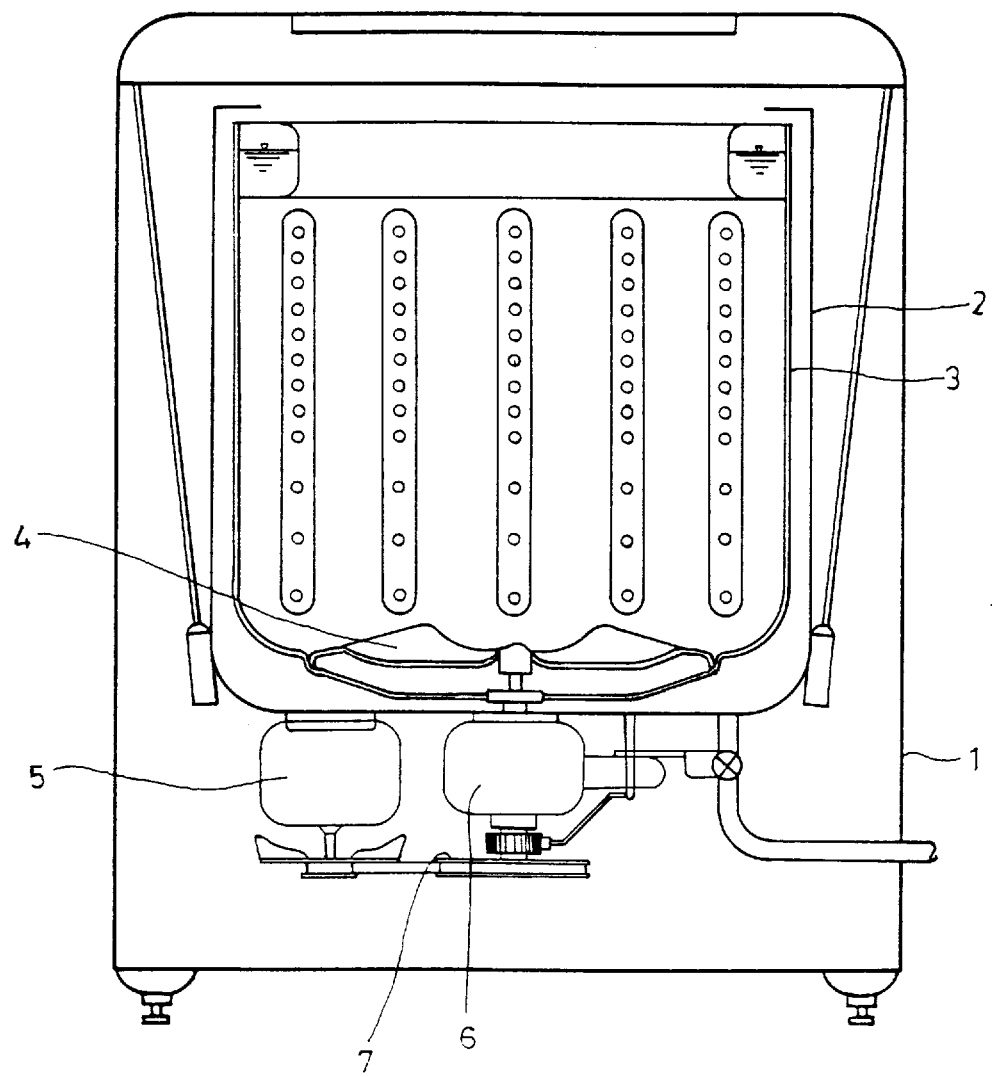
FIG. 1 is a structural view of a conventional electric clothes washing machine.
Figure 2:
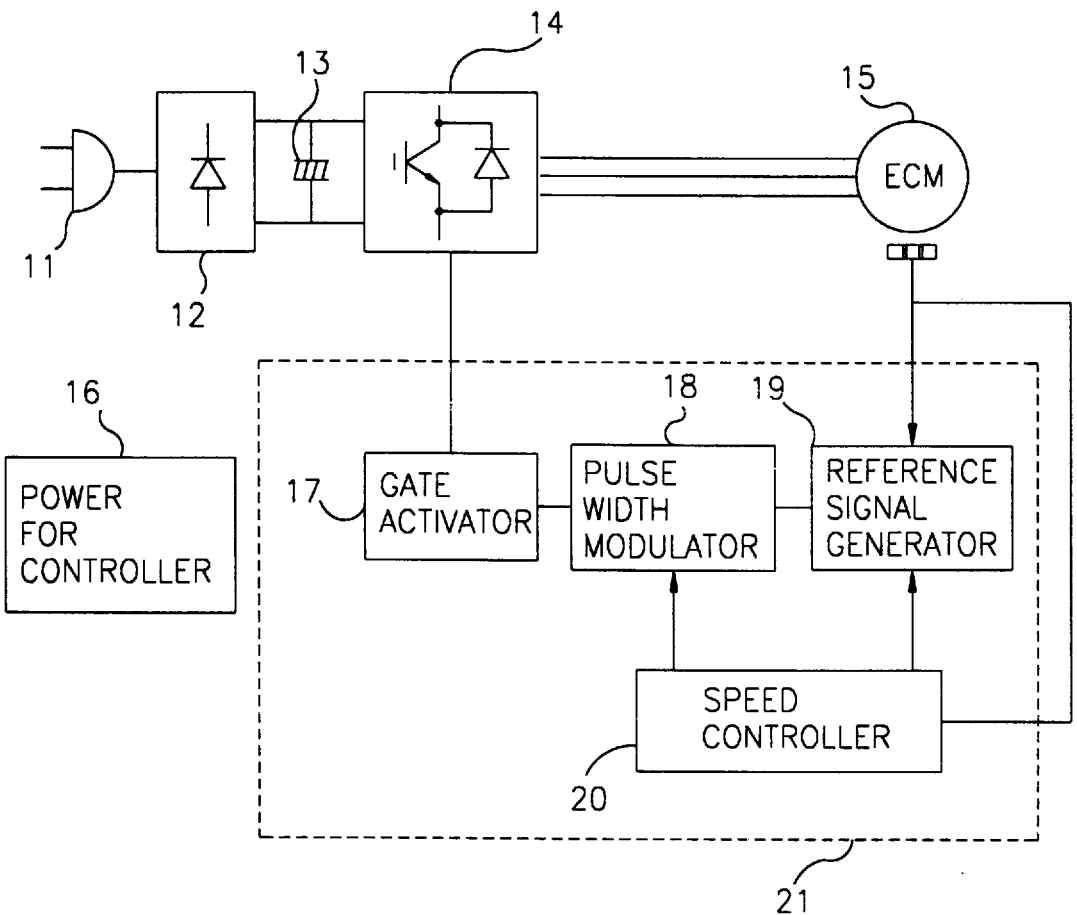
FIG. 2 is a block diagram of a motor control apparatus according to the conventional art.
Figure 3:
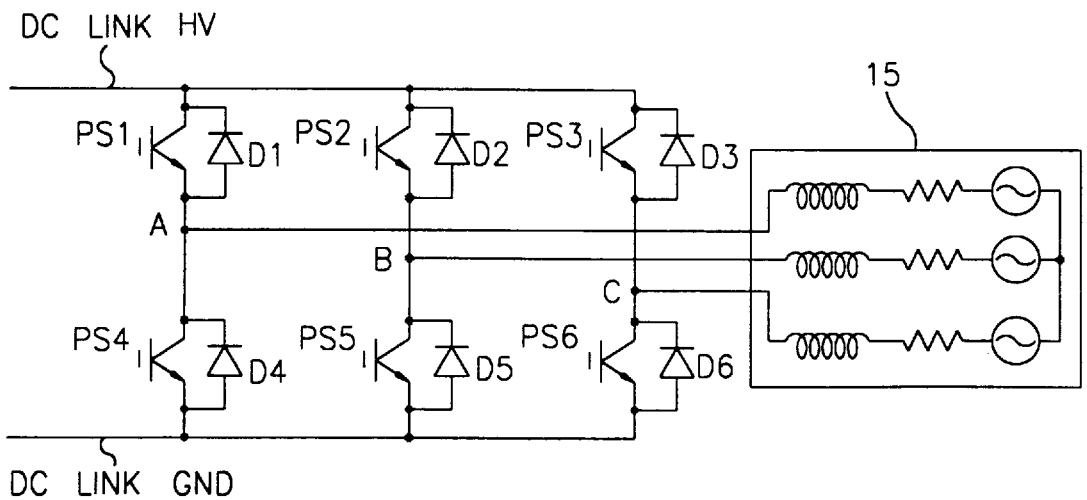
FIG. 3 is a detailed circuit diagram of an inverter together with an electrical circuit view of an ECM, in FIG. 2.
Figure 4:
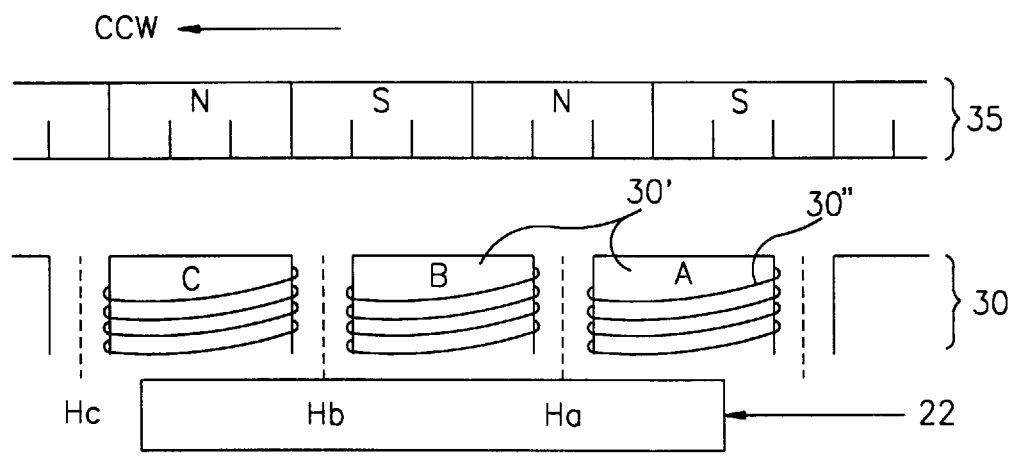
FIG. 4 is a structural diagram showing a stator, a rotor and a position sensor which are provided in the ECM in FIG. 2.
Figure 5:
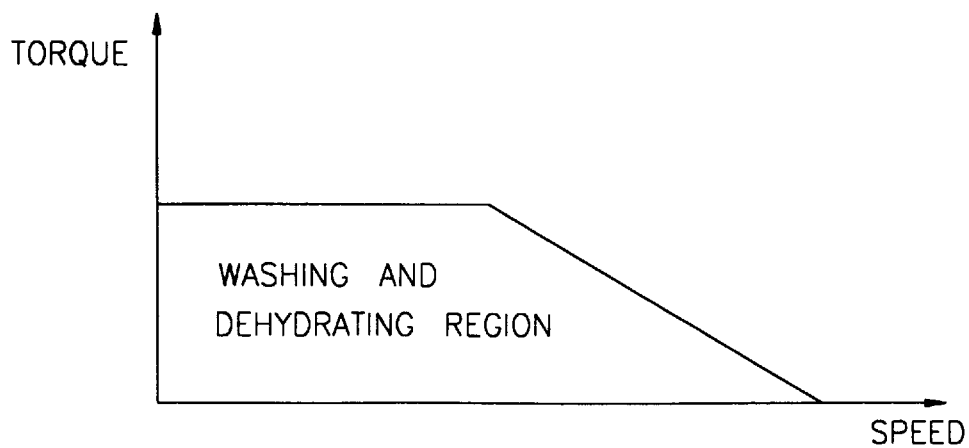
FIG. 5 is a graph showing the relative torque to spinning rate of the ECM in FIG. 2.
Figure 6:
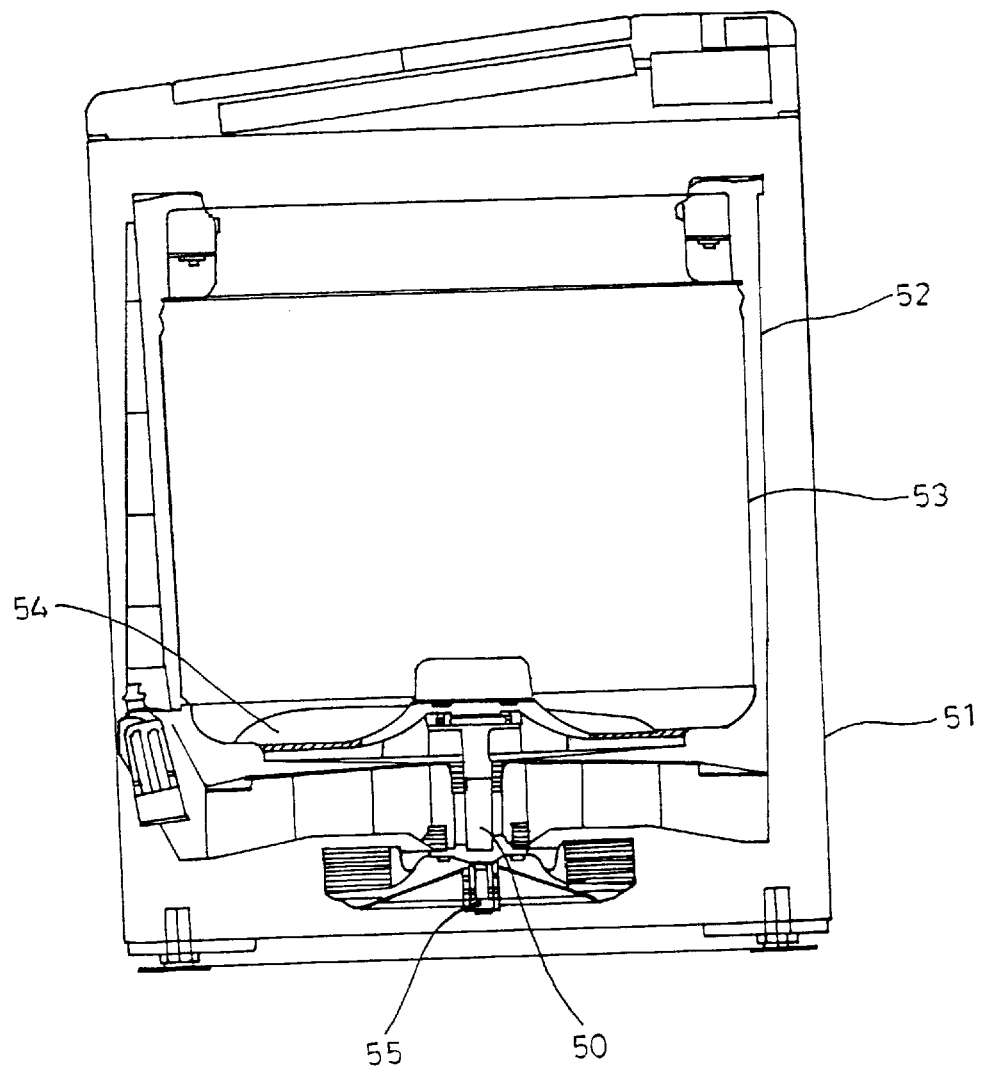
FIG. 6 is a structural view of a clothes washing machine according to the present invention.

As shown in FIG. 6, in the washing machine according to the present invention there is provided an axis, accommodating in common a washing axle and a drying axle 50, and an ECM 55 serially connected to the washing axle and the drying axle 50 without decreasing a spinning rate of the motor.

Figure 7:
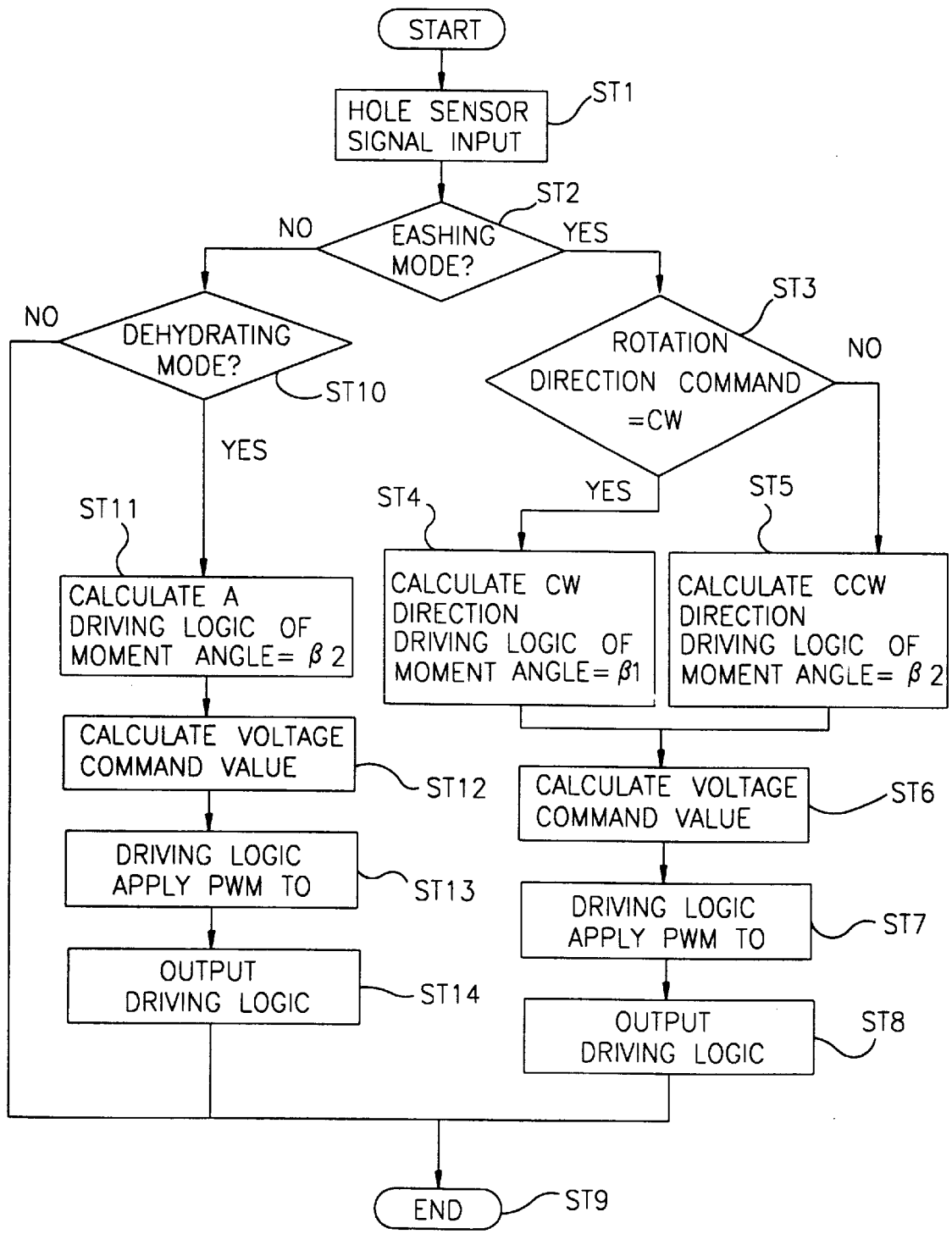
FIG. 7 is a flow chart of a motor control for a washing machine according to the present invention.

Referring to FIG. 7, when the washer operation begins, a signal is sensed from a Hall sensor (ST1), and it is judged whether to carry out a washing or drying mode (ST2).

If judged a washing mode, a rotating direction command signal is detected (ST3). Then, if there is to be generated a forward rotation (CW) a driving logic of a forward rotation having a moment angle $\beta 1$ is calculated (ST4), and if there is to be generated a counter rotation (CCW) a driving logic of a counter rotation having a moment angle $\beta 1$ is calculated (ST5), for thereby obtaining a voltage command signal in accordance with a driving logic (ST6).

Then, a pulse width modulation is carried out in accordance with the driving logic (ST7) to thereby output a voltage command value according to the modulated pulse width (ST8) thus to complete the operation (ST9).

Figures 8A, 8B, 8C, 9:
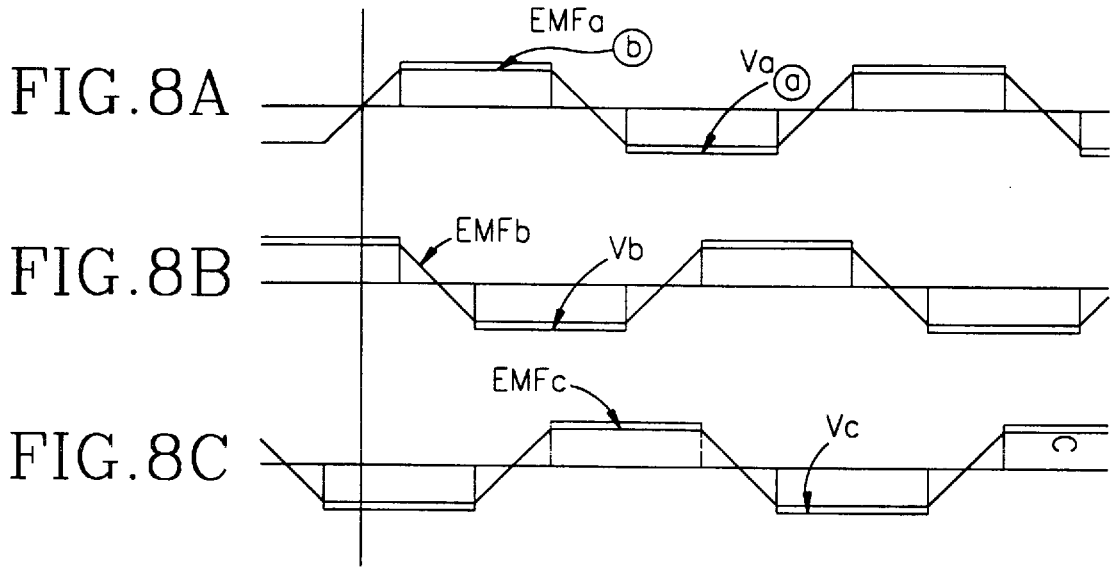
FIGS. 8A–8C are conceptual views of a motor control logic in a washing mode of a washing machine according to the present invention.
FIG. 9 is a table showing an embodiment of an operating logic to control a motor in a washing mode of a washing machine according to the present invention.

When the moment angle $\beta 1$ turns out to be "0" as in a general case, that is, when a phase difference between the electromotive force of a motor and the driving voltage is controlled to be zero since the position of the motor is detected, the voltage (a) applied to each phase of the ECM and the reverse electromotive force (b) is as shown in FIGS. 8A–8C, and the electromotive force is integrated in a trapezoid.

FIG. 9 illustrates a gate driving reference signal according to each of the phases of the ECM in FIGS. 8A–8C.

Figure 10:
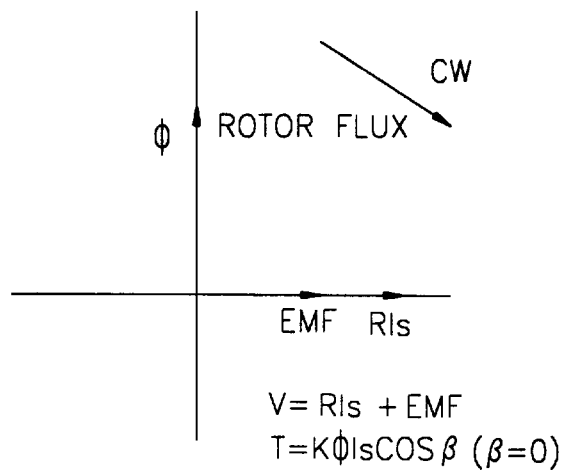
FIG. 10 is a vector diagram for controlling a motor in a washing mode of a washing machine according to the present invention.

As shown in FIG. 10, illustrating the relation between the voltage V applied to a stator coil of the motor, a motor current Is, an electromotive force EMF and a rotor flux lagging behind by 90° compared to the EMF, when the moment angle turns to zero degrees the motor generates a maximum torque at the same electrical current.

Meanwhile, in a drying mode, an increased spinning rate of the motor leads to a decreased torque due to an increased moment angle. That is, at the mode deciding step (ST2) if there is judged a drying mode (ST10), then there is calculated (ST11) a driving logic having a moment angle $\beta 2$ which is appropriate to a drying mode, thereby obtaining a voltage command signal (ST12).

Thereafter, there is performed a pulse width modulation (ST13) according to a driving logic having the moment angle $\beta 2$ and accordingly the modulated voltage command value is output (ST14), for thereby completing the drying operation (ST9).

Figure 11A:
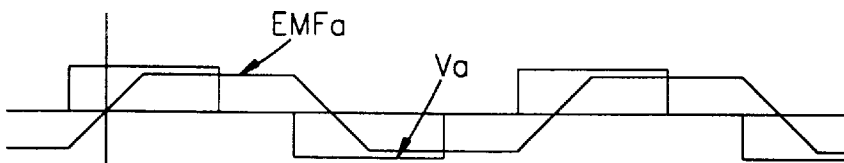
FIGS. 11A–11C are conceptual views of a motor control logic in a drying mode of a washing machine according to the present invention.
Figure 11B:
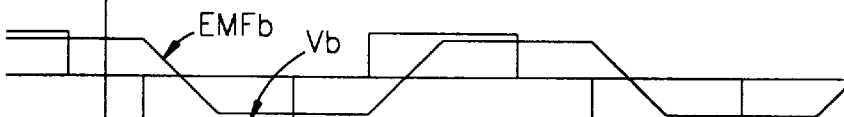
Figure 11C:
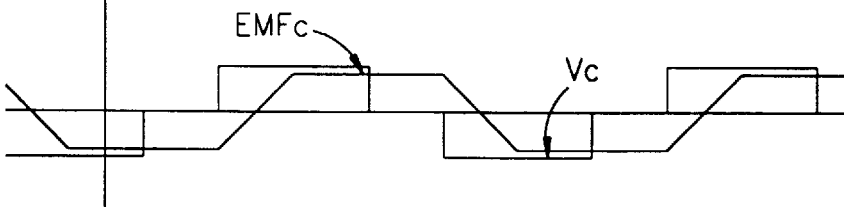

To cause the moment angle $\beta 2$ to precede that of the washing mode by 60°, the voltage (a) and EMF (b) applied to each of the phases to the ECM are as shown in FIGS. 11A–11C. FIG. 12 provides a table showing gate driving reference signals with regard to FIGS. 11A–11C.

In FIG. 13, there is illustrated the relation between the voltage V applied to a stator coil to the motor, the motor current Is, the EMF and a rotor flux lagging behind by 90° compared to the EMF.

The electrical washing machine driving control method according to the present invention provides a low speed and high torque load characteristic in a washing mode, wherein the spinning rate ranges from 30 rpm to 130 rpm, the torque has a value of about 300 Kg.F.cm. Whereas, in a drying mode, the washing machine controlled according to the present invention has a high speed and a low torque load characteristic and at this time the spinning rate ranges from 850 rpm to 1000 rpm, and the torque has a value of about 10 Kg.F.cm.

Using such a method, a low current is applicable to increasing the torque of the motor in the washing mode, and the increased moment angle enables the motor to drive at a spinning rate appropriate to drying in the drying mode, thereby enabling the operation in a washing region and a drying region, as shown in FIG. 14, by completely separating the washing region and the drying region from each other.

As described above, the increased moment angle causes the rpm of the motor to increase and the torque to decrease so that the drying region is completely separated, whereby the ECM can be controlled to provide a low speed and high torque in a washing region and a high speed and low torque in a drying region.

Further, the present invention serves to improve the price competitiveness by replacing the rectifying diodes, filter capacitor and inverter with more cost-effective substitutes. Also, the decreased input current can prevent possible damage such as fire which can be caused by an excessive current, to thus to enhance the stability of the washing machine and motor efficiency due to an decreased copper loss of the motor, thereby increasing the motor efficiency.

What is claimed is:

1. A motor control method for an automatic clothes washer having an electronically commutated motor (ECM) serving as a power source, the ECM being serially connected to a washing axle and a drying axle without decreasing a spinning rate of the ECM, comprising the steps of:

judging, when a position of the ECM is sensed from a Hall sensor input, whether the automatic washer is set in a washing mode or in a drying mode;

determining a spinning direction command signal when the automatic washer is set in a washing mode;

calculating a driving logic at a specific moment angle applicable to a washing mode in the spinning direction command signal;

calculating a speed command signal in the ECM and a voltage command signal at a real speed value;

modulating a pulse width of the voltage command signal in accordance with the driving logic; and outputting the pulse width modulated voltage command value.

2. The method of claim 1, further comprising the steps of:

calculating, when the automatic washer is set in a drying mode, a driving logic at an applied specific moment angle;

calculating a speed command signal in the ECM and a voltage command signal at a real speed value;

modulating a pulse width of the voltage command signal in the driving logic; and outputting the calculated driving logic.

3. The method of claim 2, wherein the applied specific moment angle specified in the drying mode is larger than that in the washing mode.

4. The method of claim 3, wherein the moment angle is set at 0 degrees in the washing mode and 60 degrees in the drying mode.

* * * * *